Nov. 15, 1949     B. L. NIKKEL     2,487,938
FEEDER FOR HAY BALERS

Filed Dec. 5, 1946     2 Sheets-Sheet 2

INVENTOR.
Benjamin L. Nikkel,
BY Victor J. Evans & Co.
ATTORNEYS

Patented Nov. 15, 1949

2,487,938

UNITED STATES PATENT OFFICE 2,487,938

FEEDER FOR HAY BALERS

Benjamin L. Nikkel, Windom, Kans., assignor to Long Manufacturing Company, Tarboro, N. C., a corporation of North Carolina Application December 5, 1946, Serial No. 714,178

4 Claims. (Cl. 100—25)

This invention relates to hay balers and more particularly to the apparatus for sweeping the picked up hay or straw into the hay baling chamber.

It is an object of the present invention to provide in a pick-up hay baler a simple device for sweeping the hay from the pick-up into the baling chamber and wherein the sweeping device is so located upon the baler that power for its operation can be obtained from the baling plunger so that automatically as the plunger is drawn from the chamber the sweep will be brought about to load the chamber with loose hay or straw through a side opening in the chamber.

It is another object of the present invention to provide in an operating mechanism for a hay sweep of a baler a gear quadrant having teeth adapted to engage with a chain which is vertically supported in a channel and connected for operation between the plunger and an arm loosely connected to a crank.

It is another object of the present invention to provide on the end of the sweep, fingers which will tilt upwardly to receive the hay or straw from the pick-up device, which will cause the movement of the hay over the platform extending to the chamber and which will tilt rearwardly to release the hay upon the return stroke of the sweep.

For other objects and for a better understanding of the invention, reference may be had to the following detailed description taken in connection with the accompanying drawing, in which Fig. 1 is a top plan view of the hay baler employing the sweep connected and driven according to the features of the present invention, and showing the baling chamber in horizontal section.

Fig. 5 is a detail cross-sectional view taken on line 5—5 of Fig. 1 and looking in the direction of the arrows thereof.

Figure 1:
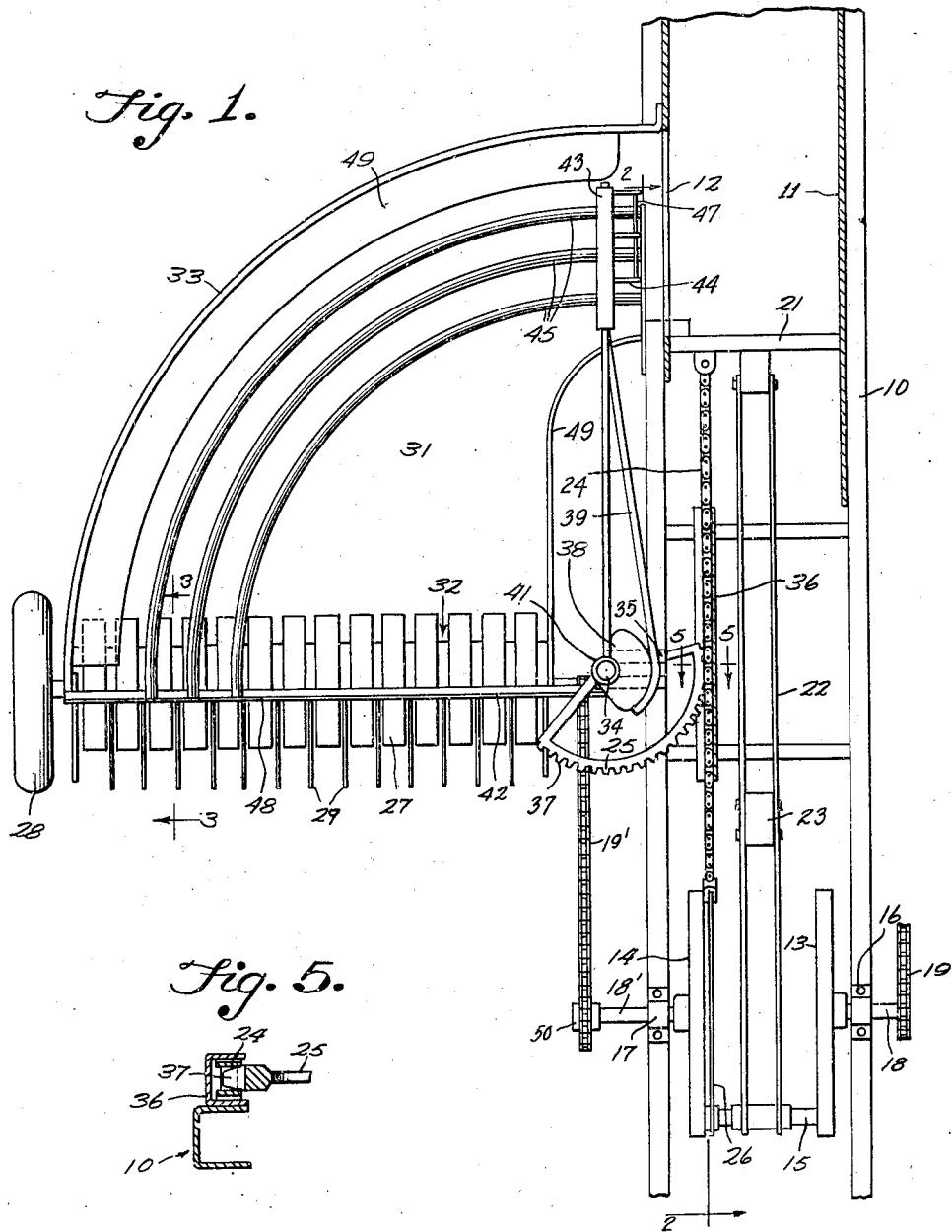
Figure 2:
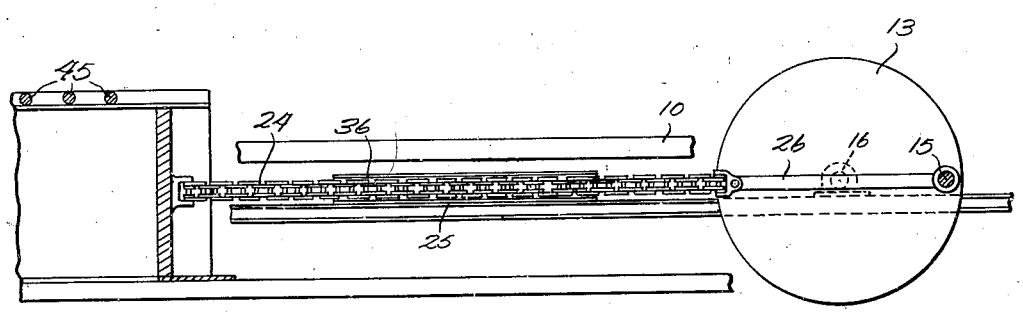
Fig. 2 is a cross-sectional view taken longitudinally of the apparatus generally on line 2—2 of Fig. 1 and looking in the direction of the arrows thereof with certain parts omitted for the purpose of clarity.
Figure 3:
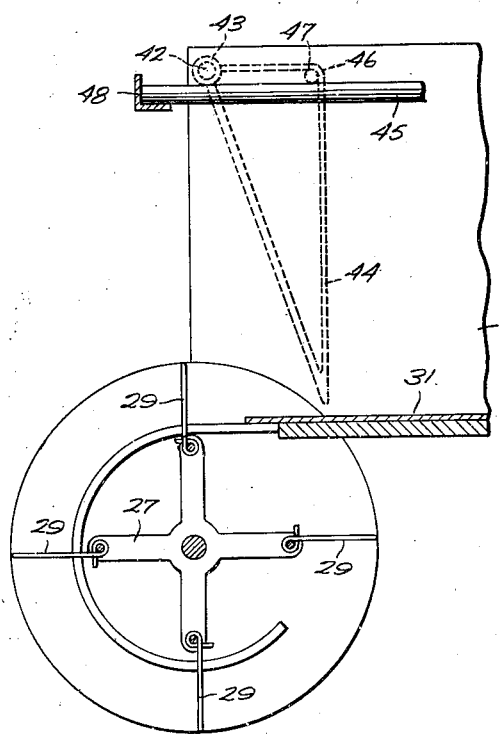
Fig. 3 is an enlarged cross-sectional view taken through the rotary pick-up with the sweep finger structure shown in broken lines when in starting position and generally on line 3—3 of Fig. 1 and looking in the direction of the arrows thereof.
Figure 4:
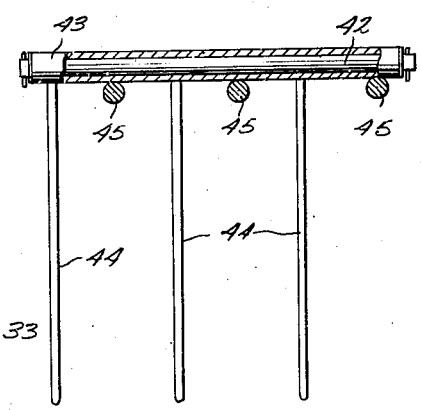
Fig. 4 is an end elevational view with certain parts in section of the sweep fingers.

Referring now to the drawing, 10 represents a hay baler frame having a hay baling chamber 11 with a side opening 12 for receiving the hay. Within the frame 10 are crank wheels 13 and 14 having a crank rod 15 extending between them. These crank wheels 13 and 14 are journalled in brackets 16 and 17 on the sides of the frame. The wheel 13 is driven through a shaft 18 driven by a sprocket chain 19 connected with some power operating part of the baler, not shown. Within the chamber 11 is a plunger 21 adapted to be operated by connecting rod parts 22 and spacer block 23 connected with the crank rod 15. Also connected between the plunger 21 and the crank rod 15 is a chain 24 for operating a gear quadrant 25. The connection of the chain 24 with the rod 15 is effected through a link 26 pivotally connected to the rod 15.

At the side of the frame 10 is a rotary pick-up device 27 supported at its outer end upon a wheel 28 and having pick-up rods 29 adapted to bring up portions of hay for deposit upon a platform 31 and over which the hay is swept by a sweep device 32 to deposit the hay within the baling chamber 11 at the time when the plunger 21 is withdrawn beyond the opening 12. The gear 14 is provided with a shaft 18' similar to shaft 18 and a sprocket chain 19' meshing with the gear 50 on the other end of the shaft 18' drives the pick-up device 27 by a suitable gear connection therewith not shown. At the outer side of the platform is a curved shield 33 for preventing the hay from leaving the rear of the platform.

The sweep device 32 is fixed to a vertically-extending pivot shaft 34 carried on brackets 35 and 35' extending from the side of the frame 10. The quadrant 25 engages with the chain 24 so that the shaft 34 is rotated. The chain 24 will be supported within a channel 36 so that it will be maintained in mesh with gear teeth 37. At the top of the shaft is a plate 38 over which a brace member 39 extends. This plate 38 has a hub 41 to which an arm 42 is connected. On the outer end of the arm 42 there is journalled a sleeve 43 having triangular shaped fingers 44 fixed thereto. These fingers 44 can pivot upon the outer end of the shaft 42 to permit the passage of hay beneath the same as it is picked up by the rods 29 of the pick-up device 27. Extending above the platform 31, are curved guide rods 45 adapted to prevent the hay from leaving the platform for passage over the side shield 33. The sleeve 43 will slide over the rods 45.

Connected between the corners 46 of the several triangular fingers 44 is a transverse rod 47 adapted to rest on the curved rods 45 and also to slide thereover. The forward ends of the curved rods are supported upon a transversely extending angle bar 48 which is connected at one end to the forward end of the shield 33 and at the other end to the bracket 35 on the frame 10. As the sweep is moved rearwardly the triangular fingers 44 will be retained vertically by the transverse bar 47. As the sweep device is brought rearwardly the fingers 44 will ride over any hay that may be in rear of the same to permit the return of the sweep device to the pick-up for another load. The hay at the inner side of the platform is retained by an inner shield 49.

As the plunger 21 is moved forwardly to uncover the opening 12 of the chamber 11 the sweep device 32 moves rearwardly to pass the hay through the opening 12 to the chamber 11. On the work stroke of the plunger 21 the sweep device is returned for another load of hay.

While various changes may be made in the detailed construction it shall be understood that such changes shall be within the spirit and scope of the present invention as defined by the appended claims.

I claim:

1. A hay or straw baler comprising a frame and a baling chamber having an opening in a side thereof, a plunger slidable in the chamber, a power device for operating the plunger, a pick-up device extending laterally from the frame to pick up hay or straw from the ground, a platform for receiving the picked up hay, a sweep device adapted to extend parallel to the pick-up device and be moved about an arc to cause hay to be forced through said side opening in the baling chamber, and drive mechanism extending between the plunger power device and the sweep device to effect the oscillation of the sweep device upon reciprocation of the plunger whereby to cause the movement of the hay into the chamber as the plunger is withdrawn therefrom.

2. A hay or straw baler comprising a frame and a baling chamber having an opening in a side thereof, a plunger slidable in the chamber, a power device for operating the plunger, a pick-up device extending laterally from the frame to pick up hay or straw from the ground, a platform for receiving the picked up hay, a sweep device adapted to extend parallel to the pick-up device and be moved about an arc to cause hay to be forced through said side opening in the baling chamber, and drive mechanism extending between the plunger power device and the sweep device to effect the oscillation of the sweep device upon reciprocation of the plunger whereby to cause the movement of the hay into the chamber as the plunger is withdrawn therefrom, said drive mechanism comprising a chain extending between the plunger and the power device, said sweep device having a quadrant with teeth meshing with the chain, and means for supporting the chain against vertical displacement at a location adjacent the quadrant.

3. A hay or straw baler comprising a frame and a baling chamber having an opening in a side thereof, a plunger slidable in the chamber, a power device for operating the plunger, a pick-up device extending laterally from the frame to pick up hay or straw from the ground, a platform for receiving the picked up hay, a sweep device adapted to extend parallel to the pick-up device and be moved about an arc to cause hay to be forced through said side opening in the baling chamber, and drive mechanism extending between the plunger power device and the sweep device to effect the oscillation of the sweep device upon reciprocation of the plunger whereby to cause the movement of the hay into the chamber as the plunger is withdrawn therefrom, said sweep device having an arm with an axle portion thereon, and hay engaging fingers journalled to the axle portion of the arm and adapted to pivot rearwardly to permit the passage of hay thereunder, and means for retaining the fingers in a fixed position as the hay is moved over the platform for delivery to the baling chamber.

4. A hay or straw baler comprising a frame and a baling chamber having an opening in a side thereof, a plunger slidable in the chamber, a power device for operating the plunger, a pick-up device extending laterally from the frame to pick up hay or straw from the ground, a platform for receiving the picked up hay, a sweep device adapted to extend parallel to the pick-up device and be moved about an arc to cause hay to be forced through said side opening in the baling chamber, and drive mechanism extending between the plunger power device and the sweep device to effect the oscillation of the sweep device upon reciprocation of the plunger whereby to cause the movement of the hay into the chamber as the plunger is withdrawn therefrom, and curved guide rods extending laterally above the platform to retain the hay against vertical displacement therefrom, said guide rods being connected at one end to the frame at a location above the opening to the baling chamber, and a transverse member connected to the frame and extending parallel to the pick-up device for supporting the opposite ends of the guide rods.

BENJAMIN L. NIKKEL.

REFERENCES CITED

The following references are of record in the file of this patent:

UNITED STATES PATENTS

| Number | Name | Date |
|---|---|---|
| 828,738 | Hanna | Aug. 14, 1906 |
| 924,775 | Hanna | June 15, 1909 |
| 1,028,404 | Trabue | June 4, 1912 |
| 2,294,440 | Barker | Sept. 1, 1942 |
| 2,362,861 | Russell | Nov. 14, 1944 |